United States Patent [19]

Karakama et al.

[11] Patent Number: 4,517,800
[45] Date of Patent: May 21, 1985

[54] HYDRAULIC CONTROL SYSTEM FOR OFF-HIGHWAY SELF-PROPELLED WORK MACHINES

[75] Inventors: Tadao Karakama, Kawasaki; Kazuo Uehara, Tokyo, both of Japan

[73] Assignee: Kabushiki Kaisha Komatsu Seisakusho, Tokyo, Japan

[21] Appl. No.: 310,424

[22] Filed: Oct. 9, 1981

[30] Foreign Application Priority Data

Oct. 31, 1980 [JP] Japan .................. 55-154835
Oct. 31, 1980 [JP] Japan .................. 55-154836

[51] Int. Cl.³ .............. B62D 5/06; F15B 11/16; F15B 13/06; F16D 33/00
[52] U.S. Cl. ....................... 60/337; 60/421; 60/422; 60/452; 91/516; 91/532; 180/132; 188/264 P
[58] Field of Search ........... 60/421, 422, 452, 337; 91/516, 532, 29, 463; 180/132; 188/264 P; 417/216, 286; 137/101

[56] References Cited

U.S. PATENT DOCUMENTS

| | | | |
|---|---|---|---|
| 2,892,311 | 6/1959 | Gerpen | 60/422 |
| 3,535,877 | 10/1970 | Becker et al. | 60/421 X |
| 3,987,623 | 10/1976 | Bianchetta | 60/422 |
| 4,033,236 | 7/1977 | Johnson et al. | 91/463 |
| 4,037,410 | 7/1977 | Jackson et al. | 60/452 |
| 4,044,786 | 8/1977 | Yip | 60/422 |
| 4,321,793 | 3/1982 | Uranaka | 60/422 |

*Primary Examiner*—Irwin C. Cohen
*Attorney, Agent, or Firm*—Armstrong, Nikaido, Marmelstein & Kubovcik

[57] ABSTRACT

A control system has two fixed-displacement pumps for supplying pressurized fluid to a pair of steering cylinders via a steering valve and to a pair of implement cylinders via an implement valve. Connected next to the pumps is a demand valve which is pilot operated to deliver to the steering cylinder pair the pressurized fluid from only one pump upon slight displacement of the steering valve and the pressurized fluid from both pumps upon greater displacement of the steering valve. The demand valve is further pilot operated to deliver to the implement cylinder pair the pressurized fluid from only one pump when the implement valve is actuated in a direction to lower the implement assembly, and the pressurized fluid from both pumps when the implement valve is actuated in a direction to raise the implement assembly. In additional embodiments the pumps are of the variable-displacement type, with their displacement adjusted by servo controls responsive to the pressure of the fluid being drained from the demand valve.

11 Claims, 7 Drawing Figures

HYDRAULIC CONTROL SYSTEM FOR OFF-HIGHWAY SELF-PROPELLED WORK MACHINES

BACKGROUND OF THE INVENTION

This invention pertains to a hydraulic control system for off-highway self-propelled work machines such as construction and industrial vehicles, notably including dump trucks and motor scrapers.

The hydraulic control system for the work machines of the type under consideration comprises means for steering the vehicle and means for actuating the implement assembly (i.e., the vessel or bowl in the case of a dump truck or motor scraper). The steering system must be reliable in construction and operation for driving safety and must permit the operator to steer the vehicle in a manner totally unaffected by variations in the speed of the vehicle engine.

The implement actuation system, on the other hand, should provide for the most efficient operation of the implement assembly with as little input horsepower as possible. In work machines such as dump trucks and motor scrapers, in particular, the lowering of the implement assembly requires only less than half as much input horsepower as that necessary for raising it. Conventionally, however, the control system has allowed consumption of the same input power for either raising or lowering the implement assembly, thus wasting a major proportion of the input in the latter instance.

A further objection to the prior art concerns systems incorporating variable displacement pumps for minimal waste of power developed thereby. In dump trucks and similar vehicles wherein the engine speed is subject to change over a wide range, the gain of the control system usually becomes too high during engine rotation at rated speed, possibly giving rise to hunting. This could of course be avoided by setting the gain at a proper value at rated engine speed, but then the setting would be too small at lower engine speed. Combined with the poor response of the variable displacement pumps compared with valves and the like, such too small gain would significantly deteriorate the response of the steering system at low engine speed.

SUMMARY OF THE INVENTION

The present invention remedies all the listed drawbacks of the prior art and realizes substantial economy in the hydraulic power used for steering and implement actuation. It also contributes to driving safety through positive, accurate steering.

Summarized in brief, the invention provides an improved hydraulic control system for vehicles of the class defined, comprising at least two sources of fluid under pressure, a steering valve for controllably actuating steering cylinder means, and an implement valve for controllably actuating implement cylinder means. Also included is a demand valve for the controlled delivery of the pressurized fluid from the two sources to the steering and the implement cylinder means via the steering and the implement valves. The demand valve is automatically actuated in response to the operation of the steering valve, permitting the delivery of the pressurized fluid from one source to the steering cylinder means upon displacement of the steering valve to less than a predetermined degree and, upon greater displacement of the steering valve, the delivery of the pressurized fluid from both sources to the steering cylinder means. The demand valve further responds to the actuation of the implement valve. When the implement valve is operated to actuate the implement cylinder means in one direction (e.g., to lower the implement assembly), the demand valve permits the delivery of the pressurized fluid from one source to the implement cylinder means. On the other hand, when the implement valve is actuated in the opposite direction (e.g., to raise the implement assembly), the demand valve causes the delivery of the pressurized fluid from both sources to the implement cylinder means.

The two sources of pressurized fluid take the form of fixed displacement pumps in one embodiment of the invention. As indicated in the foregoing summary, the steering cylinder means is driven from one or both pumps depending upon the degree to which the vehicle is steered in either direction. Waste of pump output is thus reduced to a minimum, nor is there any danger of inaccurate steering due to lack of horsepower. Further, even if one of the pumps goes into trouble during vehicle operation, the other can supply steering power, thereby averting the risk of accident. The implement cylinder means is also driven from one pump for lowering the implement assembly and from both pumps for raising it. Such selective inputting of the horsepower developed by the two pumps can save much energy, compared with the prior art wherein the same pump output has been consumed for either lifting or lowering the implement assembly.

The two sources of pressurized fluid can also be in the form of variable displacement pumps, as in additional embodiments disclosed herein, with servo control means responsive to the pressure of the fluid being drained from the demand valve. This arrangement makes possible still more economical use of energy, without the drawbacks pointed out earlier with respect to the background art. The invention also contemplates to utilize the fluid being drained from the demand valve for such useful purposes as brake cooling, as taught in some of the additional embodiments.

The above and other features and advantages of this invention and the manner of attaining them will become more apparent, and the invention itself will best be understood, from a study of the following description of the preferred embodiments illustrated in the attached drawings.

DESCRIPTION OF THE PREFERRED EMBODIMENTS

The invention will now be described more specifically in terms of its first preferable embodiment illustrated in FIG. 1. The hydraulic control system seen in this figure is suitable for use in heavy-duty dump trucks or motor scapers, among other self-propelled work machines. Broadly the control system comprises:

1. First 10 and second 12 fixed displacement pumps driven by a prime mover such as an internal combustion engine.

2. A steering valve 14 for controllably actuating a pair of steering cylinders 16 to steer the vehicle.

3. An implement valve 18 for controllably actuating a pair of implement cylinders 20 to raise or lower the implement assembly of the vehicle.

4. A demand valve 22 for delivering the pressurized hydraulic fluid from one or both of the pumps 10 and 12 to the steering valve 14 and to the implement valve 18, as required, for actuation of the steering cylinder pair 16 and the implement cylinder pair 20.

The fixed displacement pumps 10 and 12 draw hydraulic fluid from a reservoir or sump 24 and, on pressurization, deliver the fluid by way of output conduits 26 and 28 to the demand valve 22. In combination with the steering valve 14 the demand valve 22 constitutes a steering demand valve arrangement indicated by the rectangular outline referenced 30.

The demand valve 22 is of a three-position, spring-biased, pilot-operated type, having three working positions I, II and III and normally held in the first or neutral position I under the bias of a spring 32. When in the first position I, as shown, the demand valve 22 places the output conduit 26 of the first pump 10 in communication with a conduit 34 leading to the steering valve 14, and the output conduit 28 of the second pump 12 out of communication with a drain conduit 36 leading back to the reservoir 24. The second pump output conduit 28 communicates with the first pump output conduit 26 via a check valve 38, so that the pressurized fluid from the second pump 12 joins that from the first pump 10 and also flows to the steering valve 14 by way of the conduit 34 when the demand valve 22 is in the first position I.

When shifted to the second position II under pilot pressure, in a manner to be detailed subsequently, the demand valve 22 communicates the pump output conduits 26 and 28 with the conduits 34 and 36 respectively. The demand valve has, however, a restriction 40 for limiting flow from the second pump 12. Thus the pressurized fluid from the second pump partly flows to the drain conduit 36 and partly joins, via the check valve 38, the fluid from the first pump 10 to be directed toward the steering valve 14. When further moved to the third position III, the demand valve communicates the pump output conduits 26 and 28 with each other via a restriction 42 and further with the respective conduits 34 and 36. Consequently, in this third demand valve position, only part of the pressurized fluid from the first pump 10 is allowed to pass on toward the steering valve 14, whereas the rest of the fluid from the pumps 10 and 12 is drained.

Next to be referred to is the steering valve 14, which is a six-port, three-position, manually operated one, normally sprung to its center position A. When in this center position, the steering valve 14 allows the pressurized fluid from the demand valve 22 to pass on to the implement valve 18 via a conduit 44. When manually actuated to the second or right hand position B, the steering valve blocks communication between demand valve 22 and implement valve 18. Instead the steering valve places the demand valve 22 in communication with a conduit 46 leading to the rod end chamber of one of the steering cylinders 16 and to the head end chamber of the other. In the third or left hand position C the steering valve communicates the demand valve with a conduit 48 leading to the head end chamber of the one steering cylinder and to the rod end chamber of the other cylinder. Thus the vehicle is steered to the right or left as the vehicle operator actuates the steering valve 14 to the second position B or third position C. The fluid discharged from the pair of steering cylinders 16 travels back through the steering valve 14 and is drained by way of conduits 50 and 52.

For automatically actuating the demand valve 22 a pilot conduit system 54 having shuttle valves 56 and 58 extends from the conduits 46 and 48 to the right hand end of the demand valve, where the spring 32 is provided. Connected to the left hand end of the demand valve 22 is another pilot conduit 60 extending from the conduit 34.

A relief valve is provided at 62 to bleed off excessive pressures from the conduit 34 to the drain conduit 50. Another relief valve 64 acts to protect the conduit 14 from overpressurization by passing such pressure on to the drain conduit 52.

The implement valve 18 is a six-port, four-position, manually actuated one, normally closed under spring bias to block communication between the steering valve 14 and the implement cylinder pair 20. When displaced to the right or left from its normal closed position, the implement valve 18 places the conduit 44 extending from the steering valve 14 in communication with the rod or head end chambers of the implement cylinder pair 20 by way of a looped conduit 66 having a load check valve 68 and either of conduits 70 and 72. The conduit 66 communicates with the drain conduit 52 when the implement valve 18 is in the closed position. A pilot conduit 74 extends from the conduit 66 to the shuttle valve 58 of the pilot conduit system 54 thereby communicating the conduit 66 with the right hand end of the demand valve 22.

Figure 1:
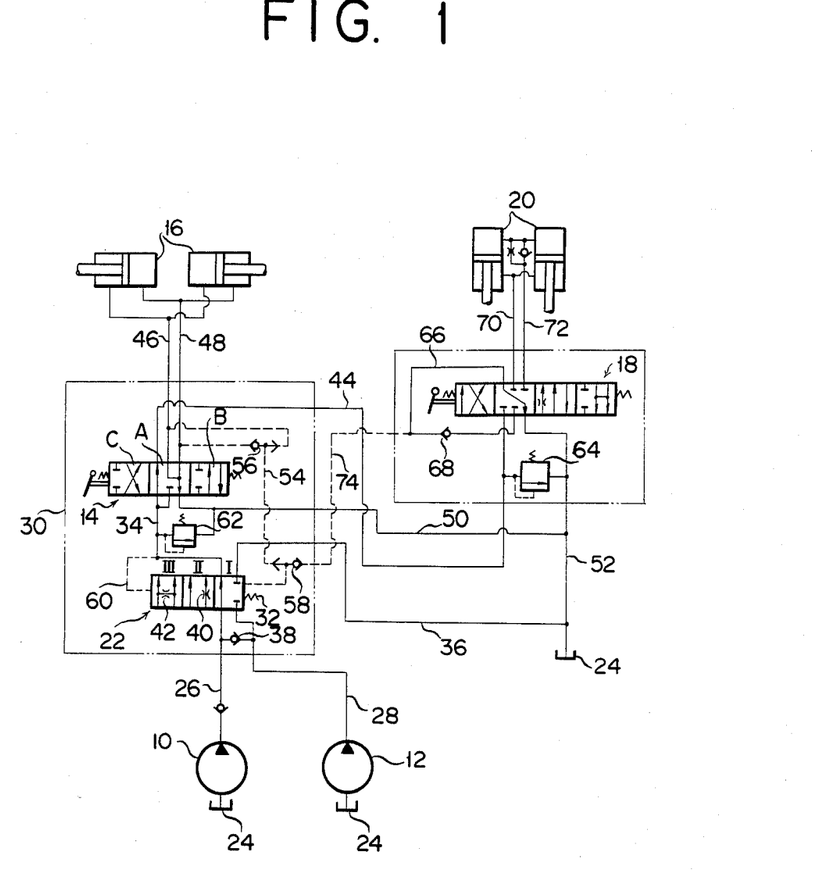
FIG. 1 is a schematic representation of a preferred form of the hydraulic control system according to the present invention, the control system incorporating fixed displacement pumps.

In operation, let it be assumed that the steering valve 14, the implement valve 18 and the demand valve 22 are all in neutral, as represented in FIG. 1. If then the two pumps 10 and 12 are set into operation, the pressurized fluid therefrom will jointly pass the demand valve 22 on to the steering valve 14 via the conduit 34 and further to the implement valve 18 via the conduit 44. Since the implement valve 18 in neutral blocks the conduit 44 from communication with the looped conduit 66, the fluid pressure in the conduit 34 rises and acts on the left hand end of the demand valve 22 via the pilot conduit 60. No pilot pressure acts now on the right hand end of the demand valve 22, so that the pilot pressure on its left hand end causes displacement of the demand valve to the third position III against the bias of the spring 32. Thus the pressurized fluid from both pumps 10 and 12 is drained by way of the drain conduit 36.

If now the vehicle operator actuates the steering valve 14 to the right or left for steering the vehicle in a desired direction, the pressurized fluid from the demand valve 22 will pass the steering valve, which is in its second B or third C position, on to the steering cylinder pair 16 by way of the conduit 46 or 48. Part of the fluid pressure in the conduit 46 or 48 is directed to the right hand end of the demand valve 22 by way of the pilot conduit system 54 with its shuttle valves 56 and 58. The pilot pressure on the right hand end of the demand valve 22 coacts with the spring 32 to cause its leftward displacement, with a consequent increase in the fluid pressure in the conduit 34 leading from the demand valve to the steering valve. The fluid under increased pressure flows into the steering cylinder pair 16 thereby causing same to turn the vehicle in the desired direction.

In practice, however, the steering valve 14 is to be displaced to varying degrees in either direction. Upon displacement of the steering valve to less than a prescribed degree, a considerable pressure will develop instantaneously in the conduit 34. This pressure, however, acts on the left hand end of the demand valve 22 via the pilot conduit 60 to cause the valve to shift to the third position III. The demand valve in the third position passes only the pressurized fluid from the first pump 10 to the conduit 34 and so protects this conduit from overpressurization.

Upon displacement of the steering valve 14 to a greater extent, on the other hand, the pressurized fluid will flow therethrough into the steering cylinder pair 16 at such a rate that the pressure in the conduit 34 will decrease. The consequent decrease in the pilot pressure on the left hand end of the demand valve 22 coacts with the increased pilot pressure on its right hand end to cause the demand valve to move to the second position II. Since the demand valve in the second position has the restriction 40 between the conduits 28 and 36, part of the pressurized fluid from the second pump 12 joins that from the first pump 10 via the check valve 38. Thus the fluid pressure for the actuation of the steering cylinder pair 16 increases to the required degree.

As may have been understood from the foregoing, only the pressurized fluid from the first pump 10 is used for driving the steering cylinder pair 16, and the complete output from the second pump 12 is drained, when the steering valve 14 is actuated to less than a prescribed degree. Wasteful use of pump output is thus avoided. Further, upon greater displacement of the steering valve, the pressurized fluid from the second pump is also delivered to the steering cylinder pair. The system is highly responsive because fluid under pressure flows into the steering cylinder pair at sufficient rates regardless of the degree of displacement of the steering valve. An additional advantage is that, in the event of the malfunctioning of either of the pumps 10 and 12, the other can supply fluid under pressure to an extent necessary for steering.

When the implement valve 18 is actuated to the right or left from its closed center position for contracting or extending the implement cylinder pair 20 the pilot conduit 74 becomes discommunicated from the drain conduit 52. Instead the implement valve 18 places the pilot conduit 74 in communication with the implement conduit 70 or 72 via the load check valve 68 and also with the conduit 44 extending between the steering valve 14 and the implement valve 18. Thus the pressure in the pilot conduit 74 rises to the loaded pressure in the implement conduit 70 or 72. This pressure in the pilot conduit 74 is directed to the right hand end of the demand valve 22 via the shuttle valve 58 and, in coaction with the spring 32, attempts to cause leftward displacement of the demand valve in opposition to the pilot pressure acting on its left hand end.

As has been stated, in work machines such as dump trucks and scrapers, much more horsepower is required for raising the implement assembly than for lowering it. It is therefore impractical to use fluid under the same pressure for extending and contracting the implement cylinder pair 20. In the illustrated embodiment, in order to preclude such wasteful use of the energy developed by the pumps 10 and 12, the fluid passage of the implement valve 18 communicating the conduit 44 and 66 in its extreme left hand position is made greater in cross-sectional area than that communicating the same conduits in its position immediately to the right of the closed center position.

Accordingly, when the implement valve 18 is actuated to the extreme left hand position for extending the implement cylinder pair 20, the fluid pressure in the conduit 44 becomes approximately equal to that in the pilot conduit 74, and the fluid pressure in the conduit 34, which is in communication with the conduit 44 via the steering valve 14, decreases to approximately the same level. The result is the leftward movement of the demand valve 22, to the first position I, where the pressurized fluid from the second pump 12 joins that from the first pump 10 to be directed toward the steering valve 14 instead of being drained. Flowing further through the conduit 44, the fluid enters the implement valve 18 thereby to be directed to toward the head end chambers of the implement cylinder pair 20. It is thus seen that the implement assembly of the vehicle is raised with the combined forces of the two pumps 10 and 12.

When the implement valve 18 is shifted to the position immediately to the right of its normal position for contracting the implement cylinder pair 20, the fluid pressure in the conduit 44 becomes higher than that in the pilot conduit 74, since the fluid passes the relatively constricted passage from the conduit 44 to the conduit 66 in communication with the pilot conduit 74. Thereupon the pilot pressure on the left hand end of the demand valve 22 overcomes the resultant of the pilot pressure on its right hand end and the force of the spring 32, thereby shifting the demand valve to the right. Thus the demand valve 22 drains the output from the second pump 12 to prevent its unnecessary loading.

The foregoing will have made clear that the implement assembly is raised with the output from both pumps 10 and 12 and lowered with the output from only the first pump 10. This is one of the advantages offered by the present invention, over the prior art where the same pump output has been used for both raising and lowering the implement assembly.

Figure 2:
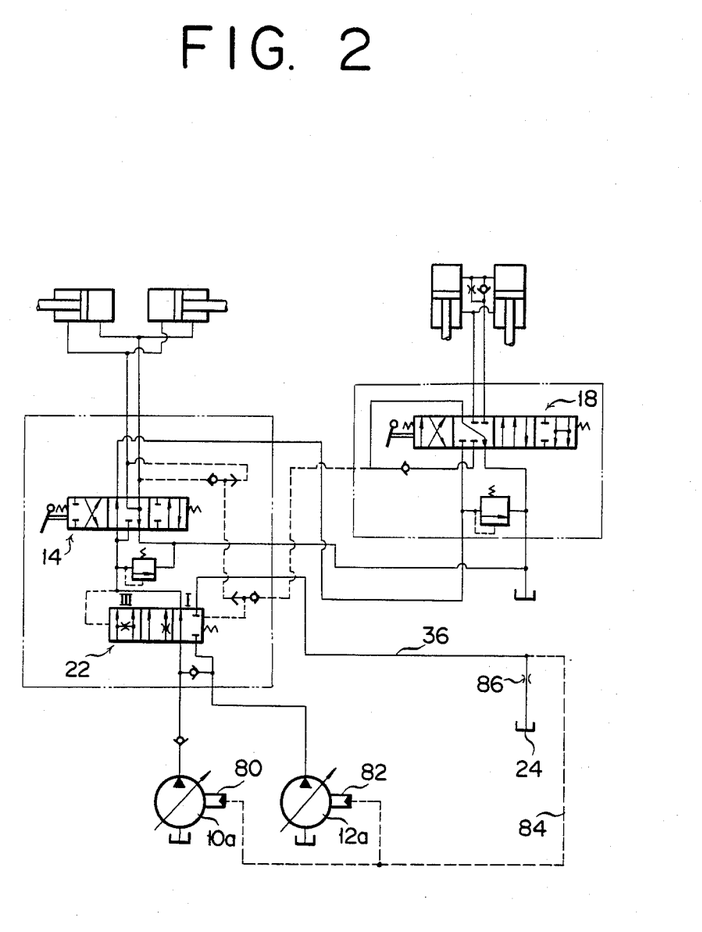
FIG. 2 is a similar representation of another preferred form of the hydraulic control system incorporating variable displacement pumps.

FIG. 2 shows a second preferable form of the hydraulic control system according to the invention, which is suitable for use in, for example, a dump truck. This system differs from that of FIG. 1 primarily in that variable displacement pumps 10a and 12a are used in place of the fixed displacement pumps 10 and 12 to realize still more economical use of pump output. Driven by the vehicle engine, the pumps 10a and 12a are provided with servo controls 80 and 82 of conventional design which are responsive to fluid pressure signals to vary the displacement of the pumps. For the delivery of such fluid pressure signals to the servo controls 80 and 82 there is employed a pilot conduit 84 connected at one end to the drain conduit 36 extending from the demand valve 22 to the reservoir 24 and branched at the other end for connection to the two servo controls. The drain conduit 36 has a restriction 86 located downstream of the point of connection with the pilot conduit 84. The other details of construction of this modified control system are identical with those of the preceding FIG. 1 embodiment.

In the operation of the FIG. 2 system, when the steering valve 14 and the implement valve 18 are both in neutral, the demand valve 22 shifts to the third position III, as has been explained in connection with FIG. 1. Since then the pressurized fluid from both variable displacement pumps 10a and 12a is directed into the drain conduit 36 having the restriction 86, the pressure in the drain conduit is at a maximum. The maximum pressure signal is applied to the servo controls 80 and 82 thereby causing same to reduce the per-cycle displacement of the pumps 10a and 12a to a minimum.

As has been stated also in conjunction with the preceding embodiment, the demand valve 22 is shifted to the right upon actuation of the steering valve 14 to less than a predetermined degree. The resulting increase in the fluid pressure in the drain conduit 36 causes the servo controls 80 and 82 to decrease the displacement of the pumps 10a and 12a. Upon greater displacement of the steering valve 14, on the other hand, the pressure in the drain conduit 36 decreases, resulting in an increase in the pump displacement.

When the implement valve 18 is shifted to the extreme left hand position for lifting the implement assembly, the demand valve 22 is moved as aforesaid to the first position I. No fluid pressure exists now in the drain conduit 36, since it is discommunicated from the pumps 10a and 12a by the demand valve 22 in the first position, so that the displacement of the pumps maximizes. Thus the combined outputs from the pumps 10a and 12a, operating with the full capacity as above, are used for raising the implement assembly.

Upon actuation of the implement valve 18 in a direction to lower the implement assembly, the demand valve 22 is shifted to the right for draining the output from the second pump 12a. The consequent pressure rise in the drain conduit 36 causes a decrease in the displacement of the pumps 10a and 12a.

The other details of operation of this FIG. 2 embodiment will be apparent from the previous description of FIG. 1. It will also have been seen that when the vehicle engine is running at relatively high speed, the demand valve passes the pressurized fluid from one variable displacement pump on to the load circuits and drains the pressurized fluid from the other pump. Consequently the system is not to suffer hunting from too much gain. When the engine speed is low, on the other hand, the pressurized fluid from both variable displacement pumps is admitted into the load circuits, thereby preventing a decrease in response due to insufficient supply of the fluid.

Figure 3:
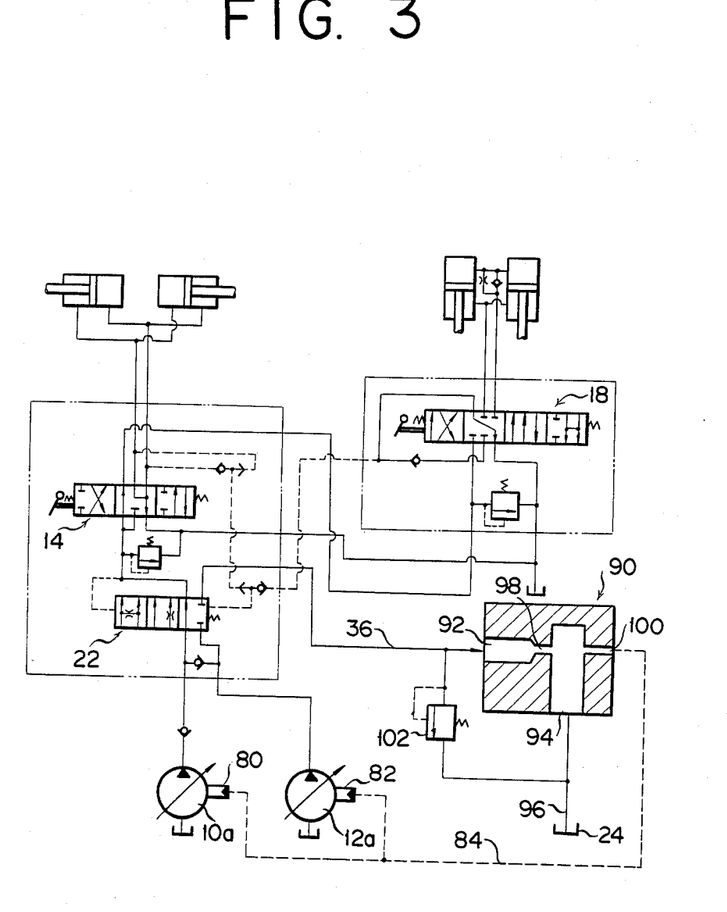
FIG. 3 is a similar representation of a slight modification of the system of FIG. 2.

FIG. 3 shows a third preferable embodiment of the invention, which in essence is a slight modification of the FIG. 2 embodiment including the variable displacement pumps. The modified control system features a dynamic pressure detector 90 connected to the drain conduit 36 extending from the demand valve 22 for deriving accurate pressure signals from the fluid being drained, for application to the servo controls 80 and 82 of the variable displacement pumps 10a and 12a.

The dynamic pressure detector 90 has an inlet port 92 for admitting the fluid being drained from the demand valve 22 by way of the drain conduit 36, an outlet port 94 open to an additional drain conduit 96 leading to the reservoir 24, a restriction 98 formed in the passageway from the inlet 92 to outlet 94 ports, and a signal port 100 disposed opposite to the restriction 98 and open to the conduit system 84 leading to the servo controls 80 and 82. A relief valve 102 is connected between the drain conduits 36 and 96, in parallel relation to the dynamic pressure detector 90, to protect the conduit 36 from overpressurization due to the presence of the dynamic pressure detector. The other details of organization of this FIG. 3 embodiment are as set forth above in relation to the FIG. 2 embodiment.

In the operation of the dynamic pressure detector 90 the static pressure created upstream of the restriction 98 therein, as the fluid is drained from the demand valve 22, is attenuated in the restriction. No rapid development of static pressure is therefore to take place at the inlet port 92. The restriction 98 is intended to derive dynamic pressure from the static pressure on its upstream side. The detector 90 directs the dynamic pressure out of the signal port 100 arranged in alignment with the restriction 98, for delivery as the desired pressure signal to the servo controls 80 and 82 of the variable displacement pumps 10a and 12a by way of the conduit system 84.

The operation of the complete control system shown in FIG. 3 is analogous with that of the FIG. 2 embodiment. For instance, when the steering valve 14 and the implement valve 18 are both in neutral, the demand valve 22 is automatically shifted as aforesaid to the third position for draining the output fluid from the two variable displacement pumps 10a and 12a. The fluid being drained from the demand valve flows through the conduit 36, the dynamic pressure detector 90 and the conduit 96. Since the fluid pressure in the drain conduit 36 is now at a maximum, the detector 90 detects the maximum dynamic pressure and correspondingly actuates the servo controls 80 and 82 of the pumps 10a and 12a to reduce their per-cycle displacement to a minimum. The other details of operation of the FIG. 3 embodiment will be self-evident from the foregoing description of FIG. 2. It will also be understood that this embodiment gains the same advantages as those set forth in connection with the FIG. 2 embodiment.

Figure 4:
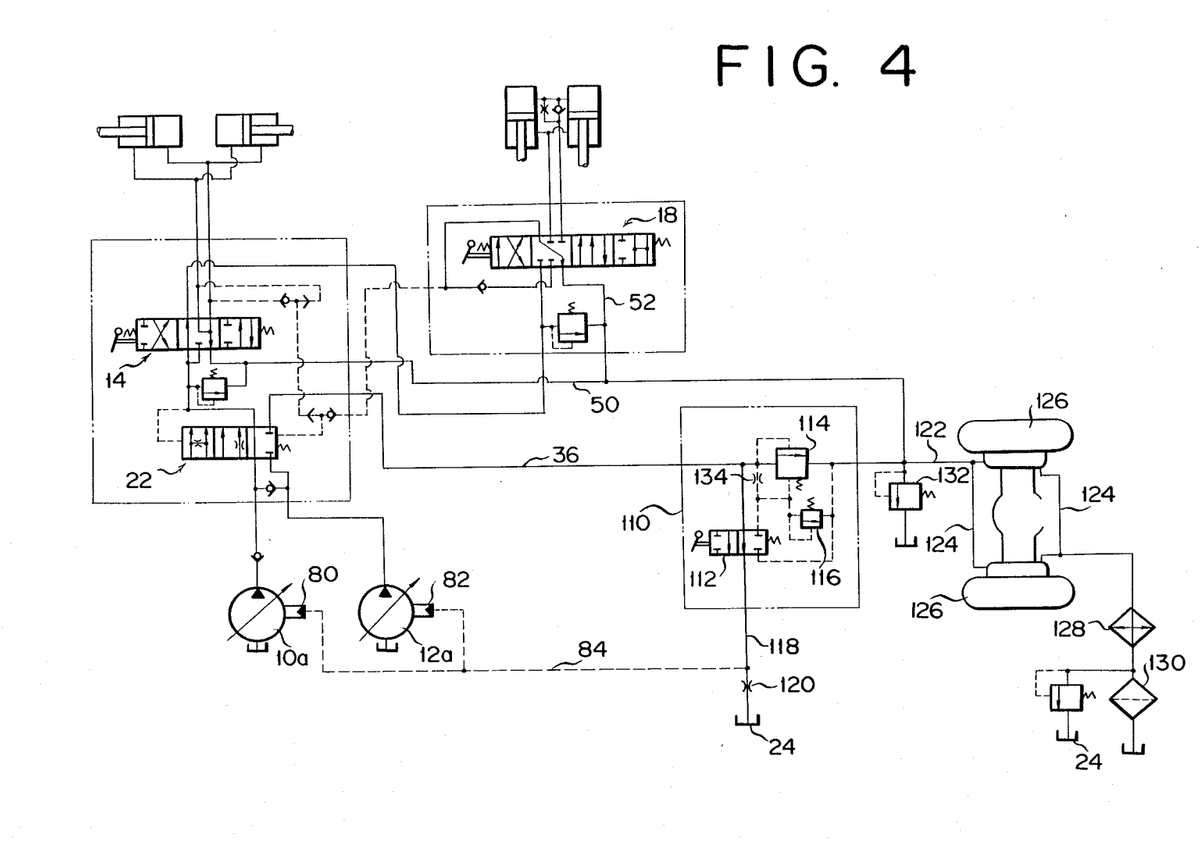
FIG. 4 is a similar representation of a further preferred form of the hydraulic control system, which is of the FIG. 2 type additionally incorporating a brake cooling function.

Illustrated in FIG. 4 is a further preferable embodiment of this invention, which is similar to that of FIG. 2 except that the brake system of the vehicle is additionally incorporated into the system. The gist of this embodiment is that, upon braking, the variable displacement pumps are automatically set at the maximum displacement, for the use of any surplus fluid under pressure for cooling the brake system.

The FIG. 4 embodiment newly introduces a brake cooling valve arrangement seen in the rectangular outline labeled 110, which is connected to the drain conduit 36 extending from the demand valve 22. The brake cooling valve arrangement 110 comprises an on-off valve 112 to be actuated to the off position upon braking of the vehicle, a main valve 114 to be opened in response to a pressure rise in the drain conduit 36, and a pilot relief valve 116 to prevent the development of excessive pressures in the conduit 36. Connected between the drain conduit 36 and an additional drain conduit 118 leading to the reservoir 24 via a restriction 120, the on-off valve 112 is normally open to allow drainage of the fluid from the demand valve 22. The drain conduit 118 is connected, at a point upstream of the restriction 120, to the conduit system 84 leading to the servo controls 80 and 82 of the variable displacement pumps 10a and 12a. The on-off valve 112 is actuated upon application of the brake system to set the drain conduit 36 out of direct communication with the reservoir 24.

Upon consequent rise in the fluid pressure in the conduit 36, the main valve 114 is opened to permit the passage of the pressurized fluid on to a conduit 122 leading to a brake cooling circuit 124 on vehicle wheels 126. The fluid that has flowed through the brake cooling circuit is directed through a cooler 128 and a filter 130, on its way back to the reservoir 24.

It will also be noted from FIG. 4 that the drain conduit 50 from the steering valve 14 and the drain conduit 52 from the implement valve 18 are both connected to the conduit 122 extending from the brake cooling valve arrangement 110 to the brake cooling circuit 124. A relief valve 132 is provided to the conduit 122 for bleeding off excessive pressures.

The operation of the FIG. 4 embodiment, insofar as its brake cooling feature is concerned, is as follows. As the vehicle operator applies the brakes in the usual manner, the on-off valve 112 of the brake cooling valve arrangement 110 is shifted to the off position to place the conduit 36 out of communication with the drain conduit 118 and the pilot conduit 84. Thus, as has been explained in relation to the preceding embodiments, the servo controls 80 and 82 respond to the zero input pressure by setting the displacement of the pumps 10a and 12a at a maximum and keep it so as long as the on-off valve 112 is held closed. The resulting pressure rise in the conduit 36 opens the brake cooling valve 114. Consequently, any more pressurized fluid than is required for the actuation of the steering cylinder pair and the implement cylinder pair passes the brake cooling valve 114 on to the brake cooling circuit 124, for cooling the applied brakes and other pertinent parts. On leaving the cooling circuit 124 the fluid itself is cooled by the cooler 128, cleaned by the filter 130, and returned to the reservoir 24.

It will have been understood that, during the normal travel of the vehicle, the on-off valve 112 of the brake cooling valve arrangement 110 functions to allow the fluid to be drained from the demand valve 22 in the usual manner. Upon braking the on-off valve 112 is closed to cause a rapid pressure rise in the drain conduit 36 extending from the demand valve 22. The brake cooling valve 114, on the other hand, acts to block the drain conduit 36 from communication with the brake cooling circuit 124 during the normal run of the vehicle, causing all the fluid to be drained through the on-off valve 112 and restriction 120. Upon brake application the brake cooling valve 114 opens to permit all the fluid from the demand valve 22 to pass therethrough and to enter the brake cooling circuit 124.

Upon development of excessive pressure in the conduit 36 while the brake cooling valve 114 is closed, the noted pilot relief valve 116 operates to cause fluid flow from an orifice 134 to the conduit 122 through the relief valve 116. The pressure differential thus created across the orifice 134 causes the brake cooling valve 114 to open, with the result that the excess fluid is drained through the brake cooling circuit 124.

The FIG. 4 embodiment is similar in other details of construction and operation to the foregoing embodiments. This embodiment offers the advantage, in addition to those already pointed out in connection with the previous embodiments, of efficiently preventing the overheating of the brakes even if they are held applied for a long time, as when the vehicle is traveling downhill. Moreover, since no pump is required exclusively for brake cooling, the complete system can be simplified in construction and manufactured at low cost.

Figure 5:
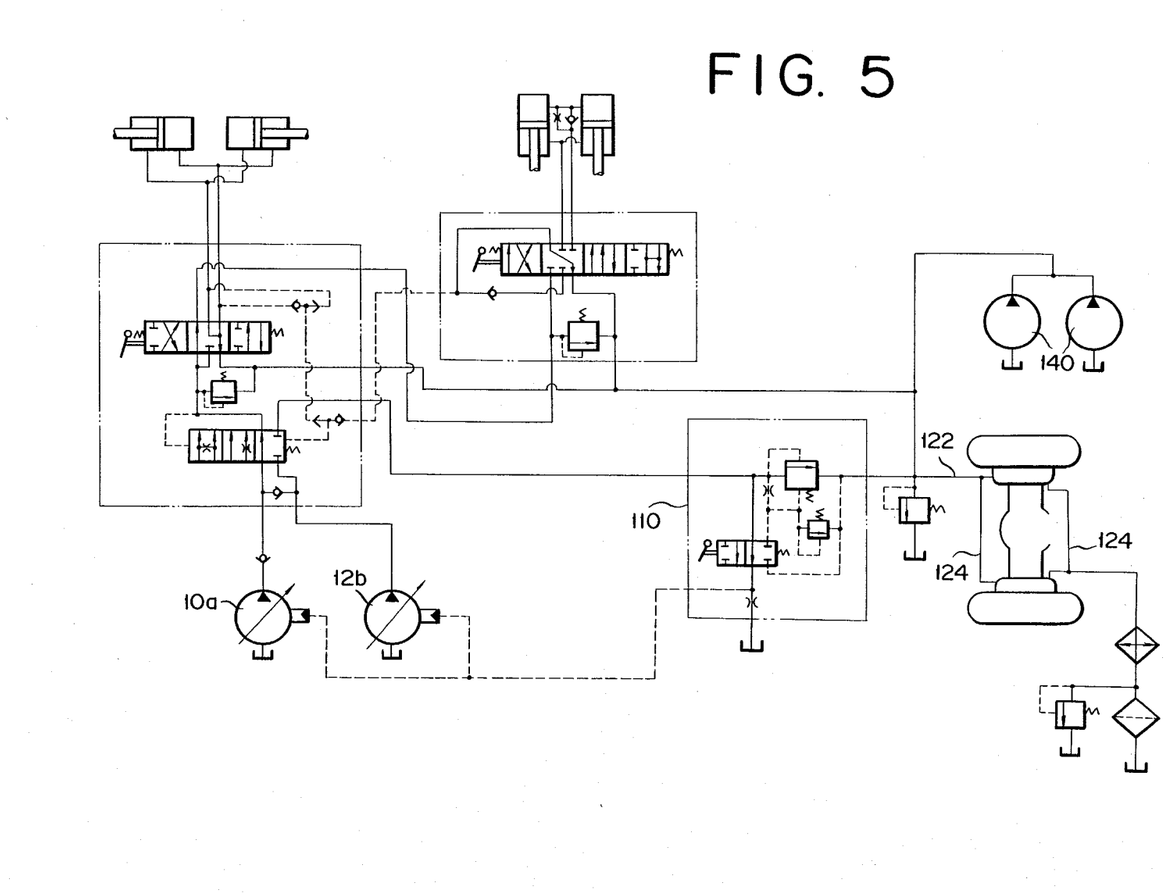
FIG. 5 is a similar representation of a slight modification of the system of FIG. 4.

If necessary, as in a modification of the FIG. 4 embodiment illustrated in FIG. 5, a brake cooling pump or pumps may be provided as at 140 for connection to the conduit 122 extending from the brake cooling valve arrangement 110 to the brake cooling circuit 124. The pump or pumps 140 can be of minimal capacity required solely for brake cooling. Thus, even if most of the output from the variable displacement pumps 10a and 12a is expended for steering and implement actuation during the application of the brakes, the pump or pumps 140 supply pressurized fluid to an extent necessary for brake cooling.

Figure 6:
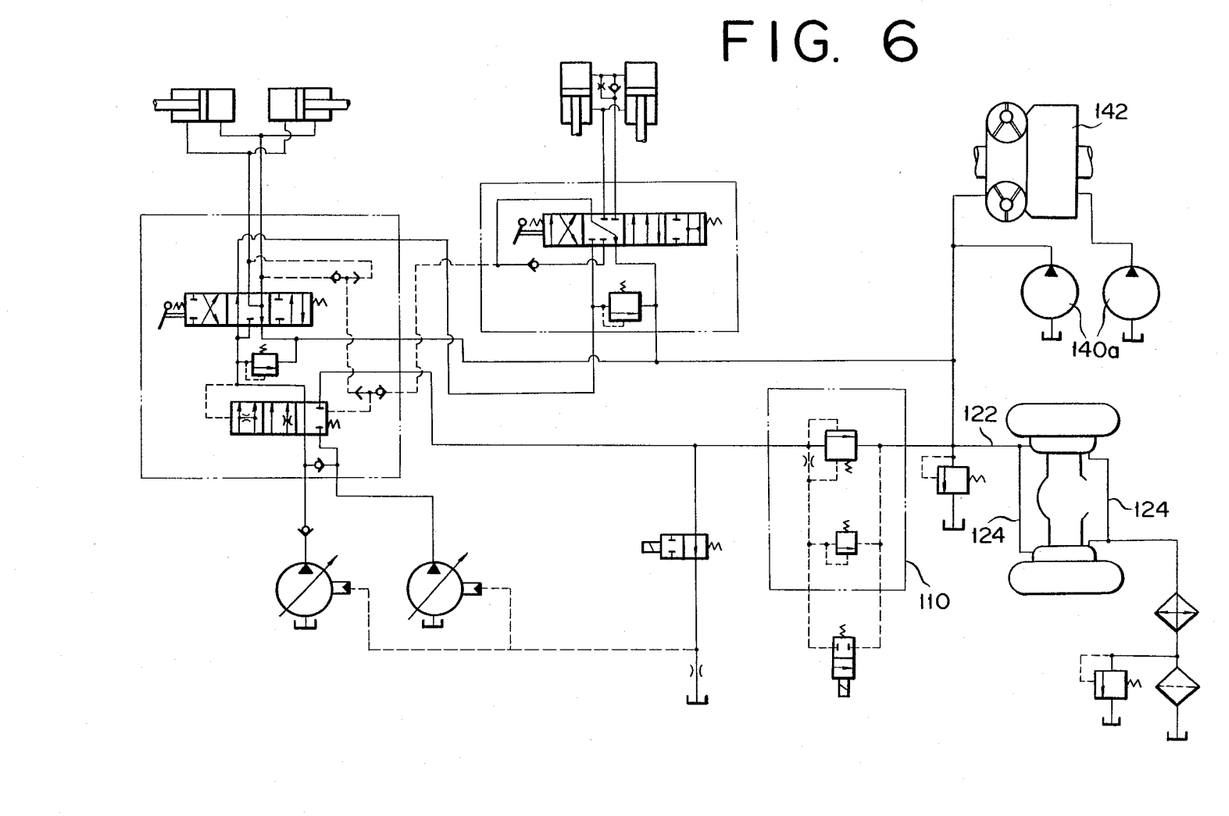
FIG. 6 is a similar representation of another slight modification of the FIG. 4 system.

FIG. 6 gives another slight modification of the FIG. 4 embodiment, in which a pump or pumps 140a for cooling a torque converter 142 incorporated in the power transmission of the vehicle are used also for brake cooling. The pumps 140a are likewise connected to the conduit 122 between the brake cooling valve arrangement 110 and the brake cooling circuit 124.

Figure 7:
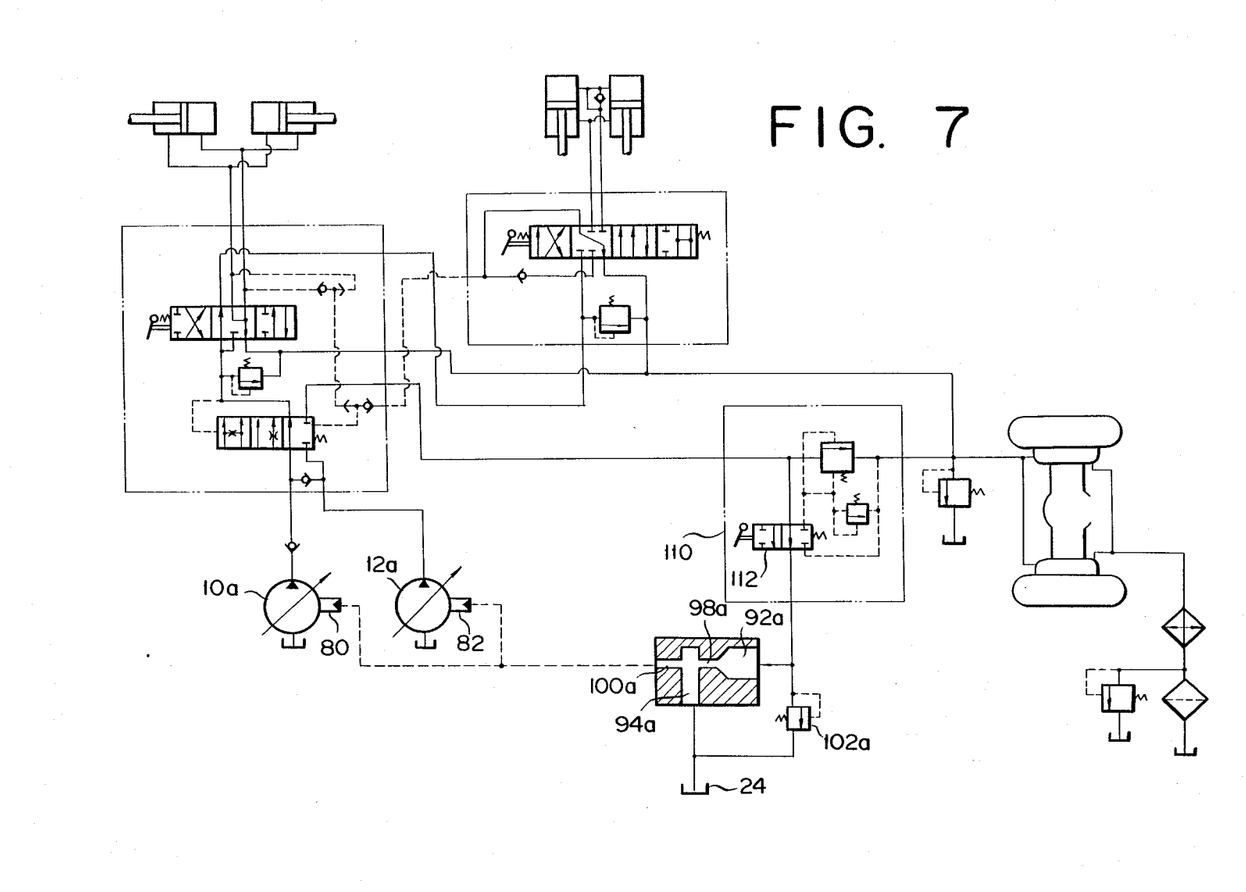
FIG. 7 is a similar representation of still another slight modification of the FIG. 4 system.

Illustrated in FIG. 7 is a still further embodiment of this invention, which may also be considered a modification of the FIG. 4 embodiment. The modification features a dynamic pressure detector 90a, similar to the one shown at 90 in FIG. 3, connected downstream of the on-off valve 112 in the brake cooling valve arrangement 110. As has been described with reference to FIG. 3, the dynamic pressure detector 90a has an inlet port 92a in direct communication with the on-off valve 112, an outlet port 94a open to the reservoir 24, a restriction 98a formed in the passageway from the inlet 92a to outlet 94a ports, and a signal port 100a formed opposite to the restriction 98a and communicating with the servo controls 80 and 82 of the variable displacement pumps 10a and 12a. Directed into the dynamic pressure detector 90a from its inlet port 92a, the pressurized fluid gives rise to dynamic pressure corresponding to the input pressure as it flows through the restriction 98a. The dynamic pressure signal is applied from the signal port 100a to the servo controls 80 and 82 of the pumps 10a and 12a for the adjustment of their displacement. A relief valve 102a is connected across the inlet 92a and outlet 94a ports of the dynamic pressure detector 90a to bleed off excessive pressures that may develop upstream of the detector.

The other details of construction and operation of this embodiment are as set forth above with reference to FIG. 4. Its advantages will also be apparent from the foregoing description of FIGS. 1 through 4.

Although the present invention has been shown and described in terms of several preferable embodiments and modifications thereof, it is to be understood that a variety of other modifications and changes may be made without departing from the spirit of the invention as expressed in the appended claims. For example, the last described embodiment of FIG. 7 may incorporate an additional brake cooling pump or pumps such as those shown at 140 in FIG. 5 or at 140a in FIG. 6.

We claim:
1. A hydraulic control system for an off-highway self-propelled work machine comprising:
(a) first and second sources of hydraulic fluid under pressure;
(b) fluid actuated steering cylinder means;
(c) a steering valve for controllably actuating the steering cylinder means;
(d) fluid actuated implement cylinder means;
(e) an implement valve for controllably actuating the implement cylinder means, said implement valve being connected downstream of said steering valve and receiving pressurized fluid therethrough;

(f) a demand valve for selectively delivering the pressurized fluid from the first and second sources to the steering valve and to the implement valve in order to permit the valves to actuate the steering cylinder means and the implement cylinder means, said demand valve having a drain line for bypassing pressurized fluid not delivered to the steering valve and to the implement valve;

(g) means responsive to the operation of the steering valve for causing the demand valve to deliver the pressurized fluid from the first source to the steering valve upon displacement of the steering valve to less than a predetermined degree and for causing the demand valve to deliver the pressurized fluid from both first and second sources to the steering valve upon greater displacement of the steering valve; and (h) means responsive to the operation of the implement valve for causing the demand valve to deliver the pressurized fluid from the first source to the implement valve when the implement valve is operated to actuate the implement cylinder means in one direction, and for causing the demand valve to deliver the pressurized fluid from both first and second sources to the implement valve when the implement valve is operated to actuate the implement cylinder means in the opposite direction.

2. The hydraulic control system as recited in claim 1, wherein the demand valve is pilot operated at one end from a conduit leading from the demand valve to the steering valve and at the other end from conduits leading from the steering valve to the steering cylinder means.

3. The hydraulic control system as recited in claim 2, wherein the demand valve is further pilot operated at said other end from the implement valve.

4. The hydraulic control system as recited in claim 1, wherein the first and second sources of pressurized fluid are fixed displacement pumps.

5. The hydraulic control system as recited in claim 1, wherein the first and second sources of pressurized fluid are variable displacement pumps, and wherein the control system further comprises servo control means for adjusting the displacement of the variable displacement pumps in response to the pressure of the fluid being drained from the demand valve.

6. The hydraulic control system as recited in claim 5, further comprising a dynamic pressure detector for deriving a dynamic pressure signal from the fluid being drained from the demand valve, the servo control means adjusting the displacement of the variable displacement pumps in response to the dynamic pressure signal from the dynamic pressure detector.

7. The hydraulic control system as recited in claim 5, wherein the control system further comprises a brake cooling circuit, and brake cooling means for causing the fluid being drained from the demand valve to flow into the brake cooling circuit upon braking.

8. The hydraulic control system as recited in claim 7, wherein the brake cooling means comprises:

(a) an on-off valve which normally allows the fluid being drained from the demand valve to be applied to the servo control means and which, on braking, discommunicates the servo control means from the demand valve for causing the servo control means to maximize the displacement of the variable displacement pumps; and (b) a brake cooling valve which is normally closed to discommunicate the brake cooling circuit from the demand valve and which is opened upon discommunication of the servo control means from the demand valve to allow the fluid being drained from the demand valve to flow into the brake cooling circuit.

9. The hydraulic control system as recited in claim 7, further comprising an additional source of pressurized fluid connected to the brake cooling circuit.

10. The hydraulic control system as recited in claim 9, wherein the additional source of pressurized fluid is also connected to a torque converter of the self-propelled work machine for cooling same.

11. The hydraulic control system as recited in claims 7, 8, 9 or 10, further comprising a dynamic pressure detector for deriving a dynamic pressure signal from the fluid being drained from the demand valve, the dynamic pressure signal being applied to the servo control means to cause same to adjust the displacement of the variable displacement pumps.

* * * * *